(12) United States Patent
Braunreiter et al.

(10) Patent No.: US 6,292,592 B1
(45) Date of Patent: Sep. 18, 2001

(54) EFFICIENT MULTI-RESOLUTION SPACE-TIME ADAPTIVE PROCESSOR

(75) Inventors: Dennis C. Braunreiter, San Diego, CA (US); Harry A. Schmitt; Hai-Wen Chen, both of Tucson, AZ (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 09/175,222

(22) Filed: Oct. 19, 1998

(51) Int. Cl.$^7$ .............................. G06K 9/36; G06K 9/00; G01S 13/00

(52) U.S. Cl. ............................ 382/240; 342/90; 382/103

(58) Field of Search .................................. 382/240, 232, 382/103, 278; 342/90, 159, 196, 162; 367/73, 38; 702/14

(56) References Cited

U.S. PATENT DOCUMENTS

| | | |
|---|---|---|
| 5,602,760 | 2/1997 | Chacon et al. . |
| 5,612,700 | 3/1997 | Tucker . |
| 5,619,998 | 4/1997 | Abdel-Malek et al. . |
| 5,748,143 * | 5/1998 | Melvin, Jr. et al. ................ 342/162 |
| 5,848,193 * | 12/1998 | Garcia ................................. 382/232 |
| 5,907,302 * | 5/1999 | Melvin, Jr. et al. ................ 342/162 |
| 5,933,546 * | 8/1999 | Stone ................................... 382/278 |
| 5,946,038 * | 8/1999 | Kalker ................................. 348/397 |
| 6,014,897 * | 1/2000 | Mo ........................................ 73/628 |
| 6,038,197 * | 3/2000 | Sitton et al. .......................... 367/38 |

OTHER PUBLICATIONS

"Image Coding Using Vector Quantization: A Review," N.M. Nasrabadi et al., IEEE Transactions on Communications, vol. 36, No. 8, Aug., 1988, pp. 957–971.*

"A Theory for Multiresolution Signal Decomposition: The Wavelet Representation," S.G. Mallat, IEEE transactions on Pattern Analysis and Machine Intelligence, vol. 11, No.7, Jul., 1989, pp. 674–693.*

"Image Coding Using Wavelet Transform,"M. Antonini et al., IEEE Transactions in Image Processing, vol. 1, No.2, Apr., 1992, pp. 205–220.*

"Target Extraction From Clutter Images Using Wavelet Packet Analysis," H.J. Kim et al., Proceedings of the 1998 IEEE Radar Conference, May, 1998, 195–200.*

* cited by examiner

*Primary Examiner*—Wenpeng Chen
(74) *Attorney, Agent, or Firm*—David W. Collins; Glenn H. Lenzen, Jr.

(57) ABSTRACT

An image processing system and method. In accordance with the inventive method, adapted for use in an illustrative image processing application, a first composite input signal is provided based on plurality of data values output from a sensor in response to a scene including a target and clutter. The composite signal is processed to provide a plurality of tap weights. The tap weights are generated by the matrix of data values which is first filtered by a wavelet transform to provide a set of coefficients. The coefficients are sparsened to provide a sparse matrix. The sparse matrix is then inverse wavelet transformed to provide the tap weights. Finally, the tap weights are applied to the composite signal to yield a clutter reduced output signal. In the illustrative implementation, the matrix is a covariance matrix. However, a method for implementing the teachings of the invention in the data domain is also disclosed. In the illustrative implementation, the sparsed matrix is inverted and a set of steering vectors is applied to create the tap weights. The invention affords an enhanced Signal-to-Interference+Noise Ratio (SINR) because (i) wavelets provide better bases for nonstationary processes and therefore offer improved sample support performance and (ii) coefficient thresholding in wavelet domain removes noisy data that is difficult to estimate.

12 Claims, 6 Drawing Sheets

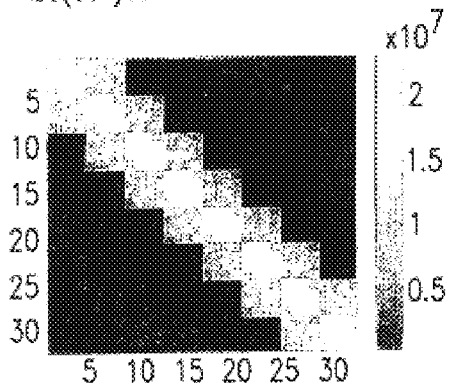
FIG. 9a
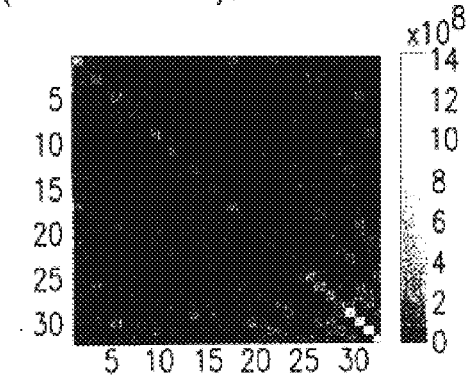
FIG. 9b
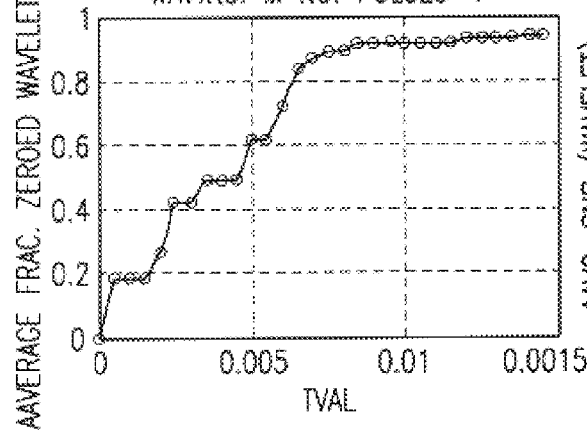
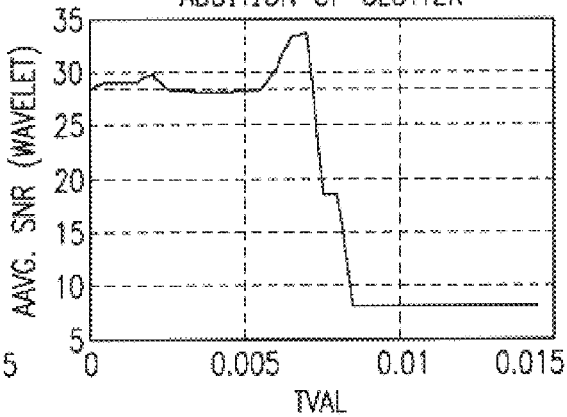
FIG. 10
FIG. 11
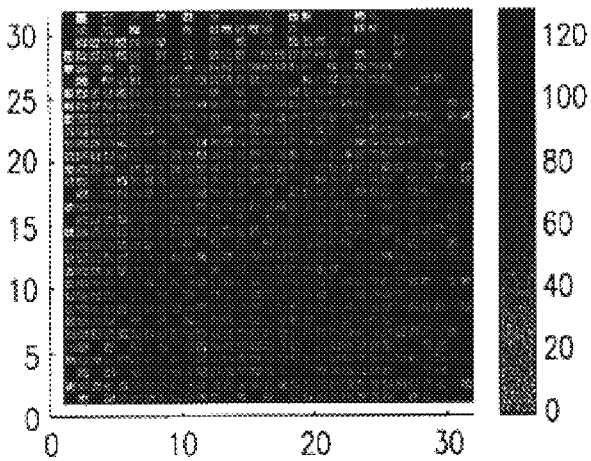

EFFICIENT MULTI-RESOLUTION SPACE-TIME ADAPTIVE PROCESSOR

BACKGROUND OF THE INVENTION

1. Field of the Invention

The present invention relates to radar and electro-optic image data processing systems and techniques. More specifically, the present invention relates to space time adaptive array processing systems and techniques for use in radar and electro-optic image data processing applications.

2. Description of the Related Art

Active and passive imaging technologies are employed in diverse applications where there is a need to track an object as it moves through space. In military and commercial applications, for example, radar is often used to track targets and other aircraft. Electro-optic technologies including laser based systems are also used for such applications.

Unfortunately, as is well known in the art, tracking of targets including aircraft and spacecraft using radar and electro-optic techniques and the tracking of vessels using sonar may be problematic due to the presence of clutter and other sources of interference. Clutter is often due to the detection of objects other than a desired target and may result from natural as well as artificial objects. Further, the clutter may vary in size and number and may be static or dynamic. Interference may be intentional and, if so, it may be designed to overpower the sensing technology or it may be designed to cause a malfunction or misread of a true target location.

Accordingly, the elimination of clutter and other sources of interference has received considerable attention from designers of passive and active tracking systems. One technique which offers the promise of being of use for such applications is called space time adaptive array processing or "STAP". Considered for use with systems that employ an array of sensing elements, STAP would involve the creation of a covariance matrix in the vicinity of the target. The covariance matrix would be used to provide an estimate of the clutter. The estimate would then be used to remove the clutter in a gate around the target.

STAP attempts to suppress spatio-temporal interference, hence covariance matrix estimates must be updated in real time to handle rapidly changing interference statistics. Unfortunately, clutter is often nonstationary due to movement or jamming. As a result, the steps of estimating the covariance matrix and canceling the clutter using STAP would be computationally intensive. Hence, the data processing requirements for current applications are often considerable, e.g., on the order of ten billion floating point operations per second (10 GFLOPS).

Accordingly, there is a need in the art for an efficient system and method for processing sensor outputs to eliminate clutter and interference for current and future military, commercial and industrial applications.

SUMMARY OF THE INVENTION

The need in the art is addressed by the image processing system and method of the present invention. In accordance with the inventive method, adapted for use in an illustrative image processing application, a first composite input signal is provided based on plurality of data values output from a sensor in response to a scene including a target and clutter. The composite signal is processed to provide a plurality of tap weights. The tap weights are generated by the matrix of data values which is first filtered by a wavelet transform to provide a set of coefficients. The coefficients are sparsened to provide a sparse matrix. The sparse matrix is then inverse wavelet transformed to provide the tap weights. Finally, the tap weights are applied to the composite signal to yield a clutter reduced output signal.

In the illustrative implementation, the matrix is a covariance matrix. However, a method for implementing the teachings of the invention in the data domain is also disclosed. In the illustrative implementation, the sparsed matrix is inverted and a set of steering vectors is applied to create the tap weights.

The invention affords an enhanced Signal-to-Interference+Noise Ratio (SINR) because (i) wavelets provide better bases for nonstationary processes and therefore offer improved sample support performance and (ii) coefficient thresholding in wavelet domain removes noisy data that is difficult to estimate.

BRIEF DESCRIPTION OF THE DRAWINGS

FIG. 9a shows a sample covariance matrix.

FIG. 9b show a discrete wavelet transform of the sample covariance matrix of FIG. 9a.

FIG. 10 depicts SNR as function of degree of sparsening of covariance matrix.

FIG. 11 depicts a 2-D histogram of significant wavelet coefficients.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
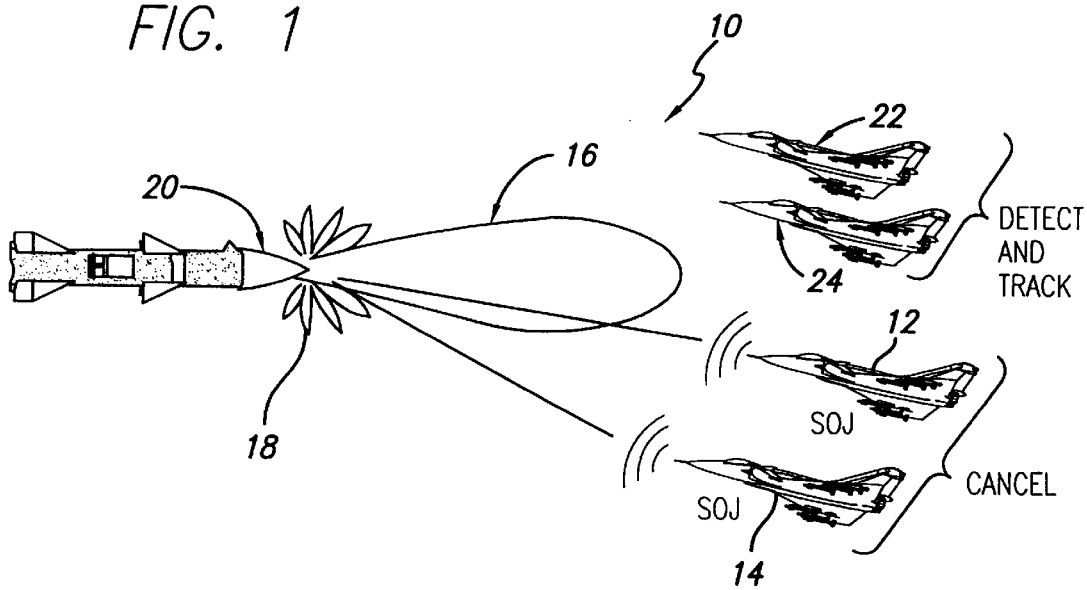
FIG. 1 shows an Electronic Counter Countermeasure (ECCM) scenario that may occur in advanced air-to-air encounters.
Figure 2A:
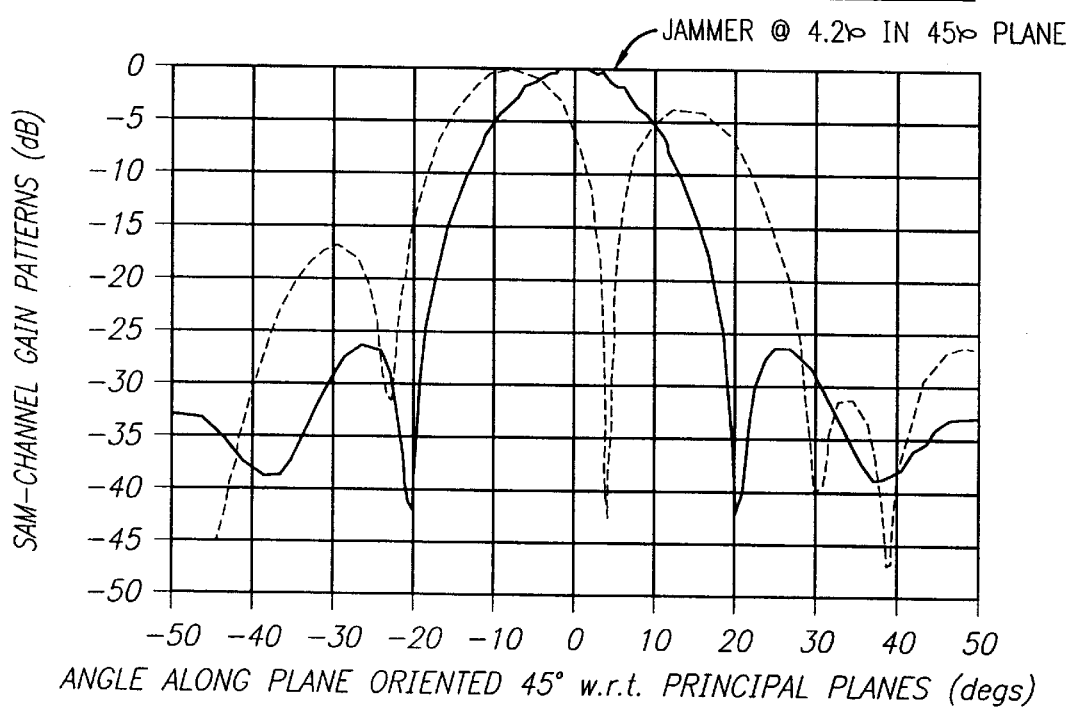
FIG. 2a shows how a notch can be placed at the location of the jammer in the main antenna beam and indicates how the effects of the jammer can be canceled.
Figure 2B:
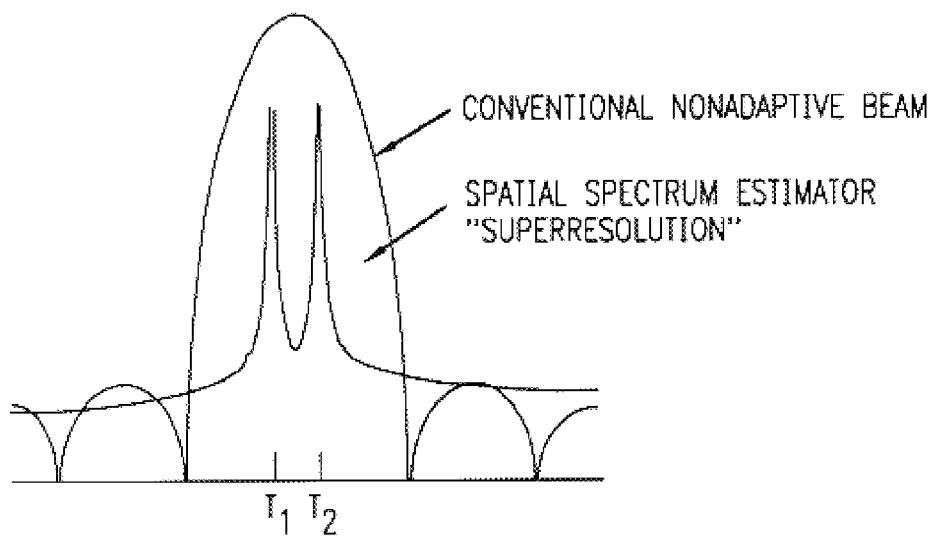
FIG. 2b illustrates how aperture-limited resolution provided by conventional nonadaptive processing is enhanced to provide subbeamwidth resolution that permits the separation of the two closely spaced targets.

FIG. 1 shows an Electronic Counter Countermeasure (ECCM) scenario 10 that may occur in advanced air-to-air encounters. Two particular jamming possibilities are illustrated: (i) a Stand Off Jammer (SOJ) 12 or 14 that places a jamming signal in the mainlobe 16 of an antenna beam from a missile 20; and (ii) two closely spaced targets 22 and 24 residing within the mainlobe 16. Both of these threats can be addressed with adaptive processing techniques. Case (i) is illustrated in FIG. 2a which shows how a notch can be placed at the location of the jammer in the main antenna beam and indicates how the effects of the jammer can be canceled. Case (ii), which is an example of superresolution, e.g., the MUSIC algorithm, is shown in FIG. 2b and illustrates how the aperture-limited resolution provided by conventional nonadaptive processing is enhanced to provide subbeamwidth resolution that permits the separation of the two closely spaced targets.

Figure 3:
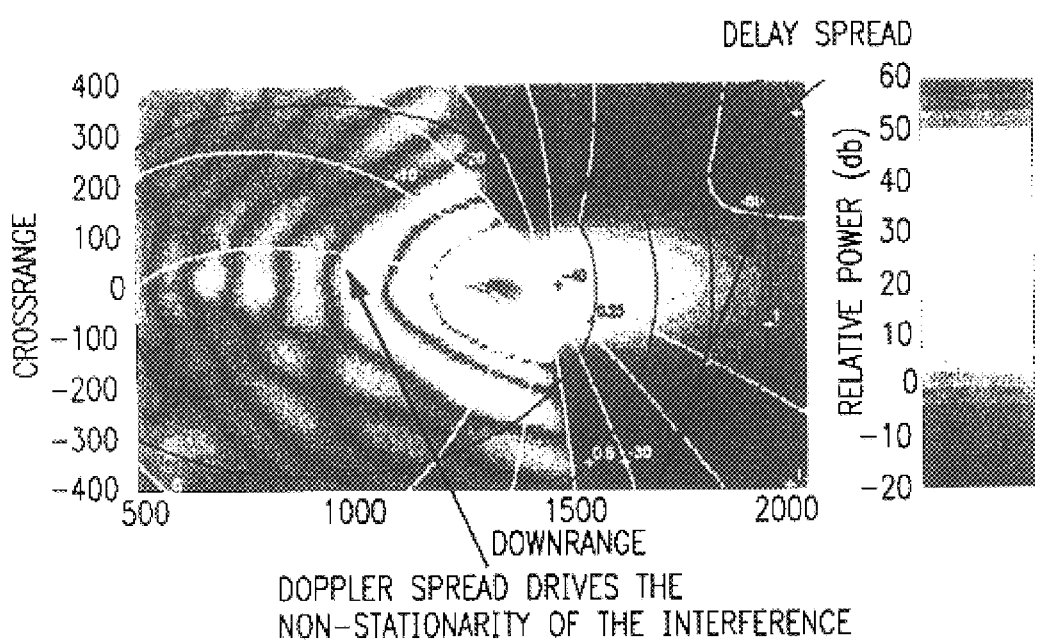
FIG. 3 illustrates range doppler spread in a terrain scattered interference jamming scenario.

FIG. 3 illustrates range doppler spread in a terrain scattered interference jamming scenario. In the typical jamming scenario illustrated in FIG. 3, the Terrain Scattered Interference (TSI) has a significant spread in range and doppler. The extraction of targets from nonstationary clutter may thus require the use of Space-Time-Doppler Adaptive Processing (STAP). In this case, the faithful representation of the covariance matrix requires a large number of degrees of freedom. It may also be possible to handle the highly nonstationary clutter environment by using fewer degrees of freedom, but processing at a much faster update rate. Either of the scenarios require multi-GFLOP processing.

The purpose of adaptive processing is to remove the interference to extract obscured targets. STAP works by estimating the covariance matrices from sample data that does not contain the target.

Figure 4:
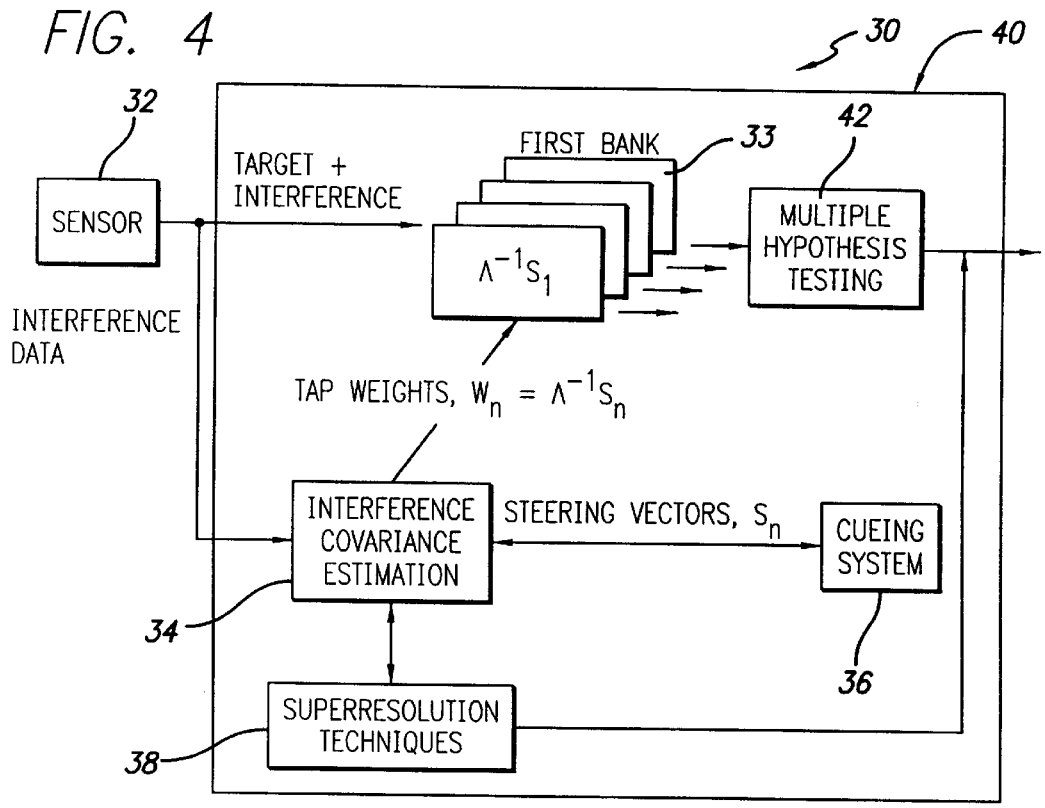
FIG. 4 is a block diagram illustrative of the efficient multi-resolution space time adaptive processing system and method of the present invention.

FIG. 4 is a block diagram illustrative of the efficient multi-resolution space time adaptive processing system and method of the present invention. The system 30 includes a sensor 32 and a STAP processor 40. The sensor 32 is typically electromagnetic, e.g., radar, or electro-optic, e.g., laser. The STAP processor 40 is implemented in accordance with the present teachings preferably in an application specific integrated circuit (ASIC) or a field programmable gate array (FPGA). The STAP processor 40 is implemented within a digital processing system (not shown) provided between the sensor 32 and a system (not shown) for providing track processing, control or display as will be appreciated by those skilled in the art. The sensor 32 outputs an electrical data signal that represents a target and interference. The sensor output is input to a filter bank 33 and a covariance estimator 34. A set of weight vectors, $W_n$, is output by the estimator 34 from a sample covariance matrix, $\Lambda$, and a set of steering vectors, $S_n$. The steering vectors $S_n$ is supplied by a cueing system 36 as is common in the art. The tap weights are used by the filter bank to filter the clutter from the sensor output in a conventional manner. The system 40 solves, in real time, the matrix equation:

$$W_n = \Lambda^{-1} S_n \quad [1]$$

In accordance with conventional teachings, this is a numerically intensive process that drives the STAP throughput requirements. However, as set forth below, the present invention reduces the computational requirements of STAP processing.

STAP Processing Using Wavelet Transforms

The present invention treats the matrices that arise in RF STAP—Range Doppler Maps, Data Matrices and Covariance Matrices—as images and then exploit techniques that have been developed in multiresolution image analysis. Specific properties of the wavelet transform that are useful include: sparsening, denoising, edge detection and efficient bases for nonstationary processes. A brief introduction to wavelets and wavelet packets is provided below to facilitate an understanding of the present invention. The reader is referred to a number of excellent papers for more detailed information. (See for example, "Ten Lectures on Wavelets," by I. Daubeshies, SIAM, Philadelphia, Pa., 1992 and "A theory for Multiresolution Signal Decomposition: The Wavelet Representation," by S. Mallat, IEEE Trans., Pattern Anal. Mach. Intel., Vol. 11, pp. 674–693, 1989.)

Introduction to Wavelets and Wavelet Packets

The wavelet transform is characterized by a dilation parameter and a translation parameter. Continuous wavelet transforms have the properties that they possess a decomposition of the identity and are overcomplete. For this reason, they are not efficient computationally and thus have not found widespread engineering applications.

In 1989, Mallat introduced a pyramidal algorithm for the discrete wavelet transform (DWT) that, like the FFT, is a fast, linear operation that operates on a data vector.

Figure 5:
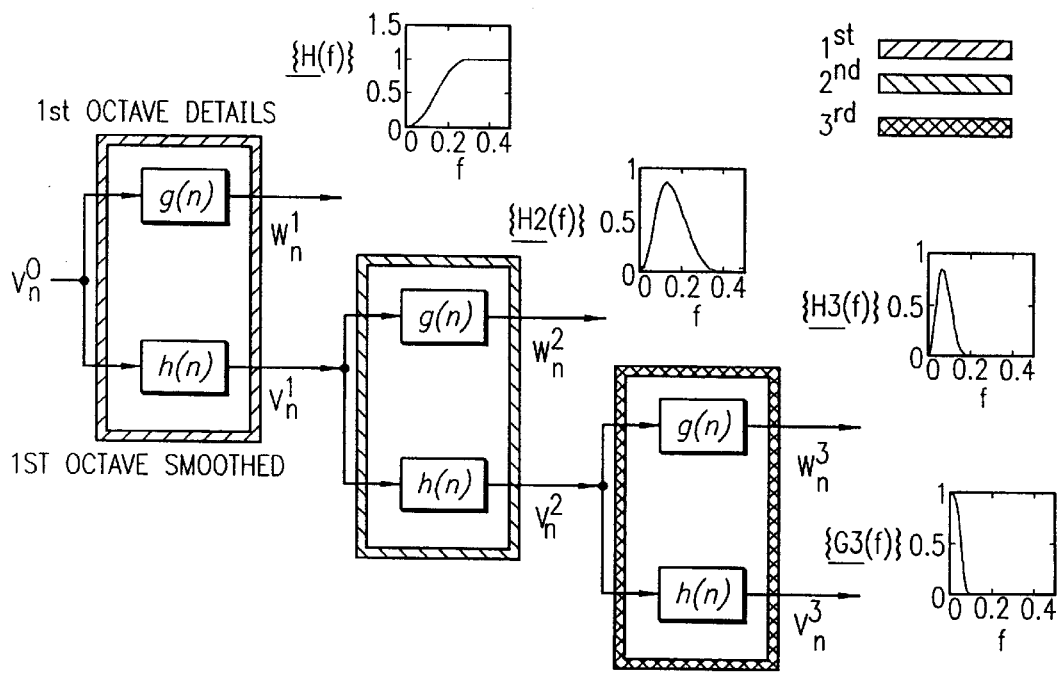
FIG. 5 illustrates a pyramidal algorithm.

FIG. 5 illustrates the pyramidal algorithm introduced by Mallat. A Quadrature Mirror Filter pair, g(n) and h(n), is first constructed. The data vector $V_n^0$ is then processed into a smoothed portion, $V_n^1$, and a details portion, $W_n^1$. The first octave smoothed vector is again decomposed into the second octave smoothed and detail data vector. The process is repeated for each smoothed vector; the result is an $g(n)$ orthogonal subspace decomposition of the data vector with no redundancy. The decomposition of the vector into a series of orthogonal vector spaces allows each octave to be processed independently. This so-called multi-resolution decomposition is the basis for many proposed applications.

Figure 6:
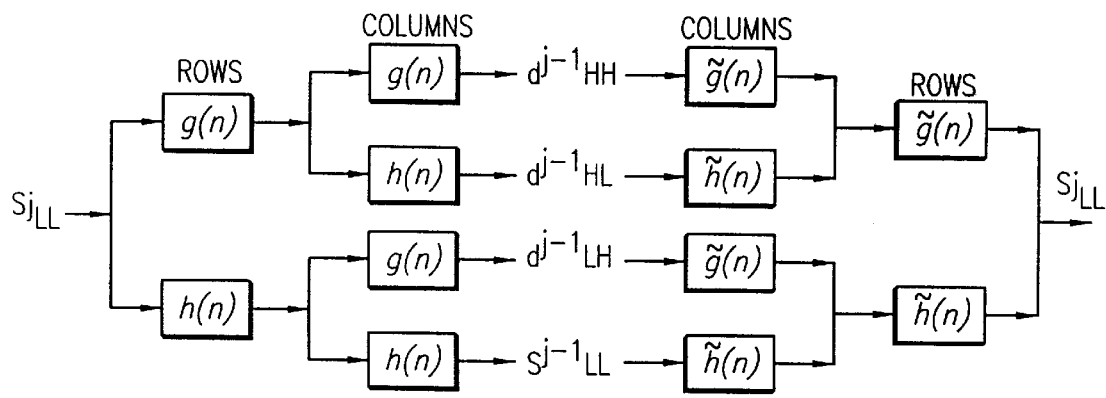
FIG. 6 illustrates an extension of a one-dimensional pyramidal algorithm to two dimensions.

FIG. 6 illustrates an extension of a one-dimensional pyramidal algorithm to two dimensions. The 2-D DWT shown here is separable; it is the tensor product of two 1-D DWTs: $T(x,y)=T(x) \otimes T(y)$. The 2-D DWT is used to decompose and reconstruct a two dimensional data vector, i.e., a matrix.

Figure 7:
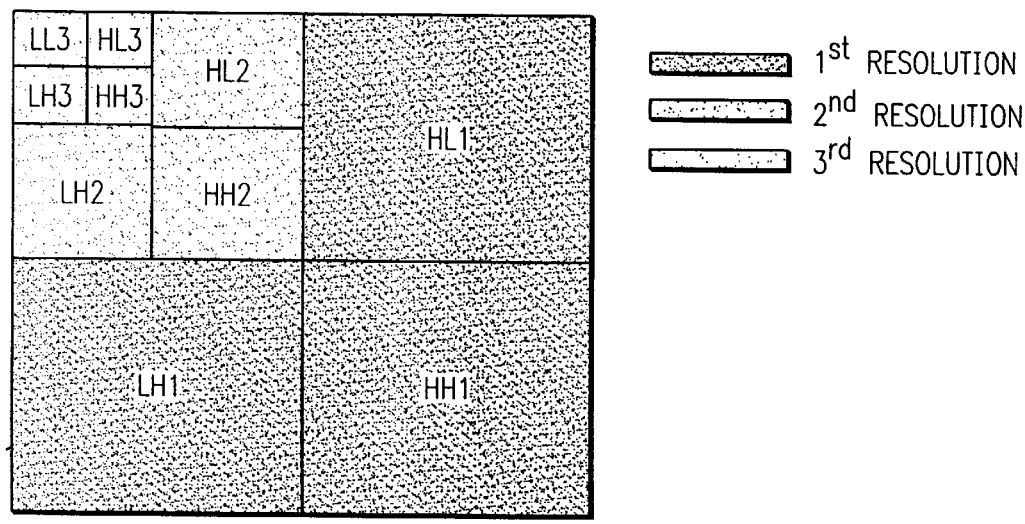
FIG. 7 represents a wavelet coefficient mapping of a decomposed matrix and clearly shows the multiple resolutions.

FIG. 7 represents a wavelet coefficient mapping of a decomposed matrix and clearly shows the multiple resolutions. This multi-resolution property may provide a useful approach to target discrimination based on feature extraction since many target characteristics appear differently at each resolution level.

The discrete wavelet packet (DWP) is a generalization of the DWT in that both the details and smoothed portions of the data vector are filtered at each octave. The DWP tree is then pruned and a 'best basis' is selected based on entropy or similar criteria.

While both the FFT and DWT map the data vector from one vector space into another, their basis functions are significantly different. The basis function for the FFT are complex exponentials, which are localized in frequency but not in time; the basis functions for the DWT are much more general and are localized in both frequency and time. It is this dual localization that renders large classes of functions sparse in the wavelet domain.

STAP Implementation using the DWT

Figure 8:
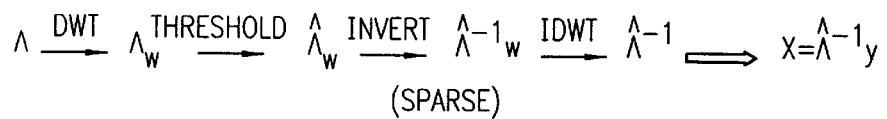
FIG. 8 is a diagram illustrating a sparsening of a covariance matrix using a discrete wavelet transform in accordance with the method of the present invention.

FIG. 8 is a diagram illustrating a sparsening of a covariance matrix using a discrete wavelet transform in accordance with the method of the present invention. The present invention uses the wavelet transform to solve Eq. [1] in a computationally efficient manner. As shown schematically in FIG. 8, the sample covariance matrix $\Lambda$ is first transformed using a Discrete Wavelet Transform (DWT) into $\Lambda_W$. Next, the transformed matrix $\Lambda_W$ is sparsed. During the sparsing operation, small coefficients are thresholded to zero, resulting in a sparsened matrix $\hat{\Lambda}_W$. The sparsened matrix $\hat{\Lambda}_W$ is then inverted to yield $\hat{\Lambda}_W^{-1}$ and transformed using an Inverse DWT (IDWT) to yield $\hat{\Lambda}^{-1}$. This value $\hat{\Lambda}^{-1}$ is then inserted into equation [1] above to calculate the tap weights. Those skilled in the art will appreciate that the invention is not limited to the thresholding technique employed in the sparsening operation. A number of thresholding techniques can be employed, including global thresholding, zero trees, and vector quantization See "Image Coding Using Wavelet Transform," by Antonini, M. Barlaud, P. Mathieu, and I. Daubechies, IEEE, Trans. Image Processing, Vol. 1, pp. 205–220, 1992 and "Image Coding Using Vector Quantization: A Review," by Nasrabadi and R. King, IEEE, Trans. Commun., Vol. 36, August 1988.

FIG. 9a shows a sample covariance matrix. FIG. 9b show a discrete wavelet transform of the sample covariance matrix of FIG. 9a. The physical environment is representative of TSI and was generated from a high fidelity simulation. A banding structure, indicative of a sparse matrix, is clearly present in the transformed sample covariance matrix. This banding structure is known to be a rather general property of many types of scattering and does not depend on the specific details of the TSI model.

While significant sparsening can clearly be achieved, there are two major concerns with working in the DWT domain: performance degradation and transform overhead. These issues are addressed below.

Performance Evaluation

FIG. 10 depicts SNR as function of degree of sparsening of covariance matrix. An appropriate metric for evaluating the wavelet transform is the SNR as a function of sparsening of the sample covariance matrix. From FIG. 10, it can be seen that a sparsening of approximately 90% can be achieved without materially degrading the SNR. Interestingly, a slight increase in SNR is evident for some sparsening; there are several interpretations of this: de-noising, improved training data, etc. The ability to achieve significant sparsening is an indication that the DWT is in some sense a close approximation to a data independent Karhunen-Loeve Transform.

Temporal Stability of the DWT Coefficients and Data Domain Processing

In this section, the difficult problem of reducing the overhead required when constructing and implementing the DWT is considered. Two techniques are examined separately: temporal stability and data domain processing.

Temporal Stability

This section discusses the investigation into temporal stability of the wavelet coefficients. Those skilled in the art will appreciate that although the magnitude of the significant wavelet coefficients could change rapidly in time, their location might not. It turns out that this is indeed the case, as illustrated in FIG. 11.

FIG. 11 depicts a 2-D histogram of significant wavelet coefficients. What is plotted here is a histogram of significant wavelet coefficients across 128 Pulse Repetition Intervals (PRIs). The majority of the histogram values were either 0 or 128, indicating that the coefficients were either significant or insignificant for all PRIs. This was further borne out (c.f., FIG. 12) by calculating the SNR as a function of sparsening by forming a template on the first PRI and using that for all remaining PRIs.

Figure 12A:
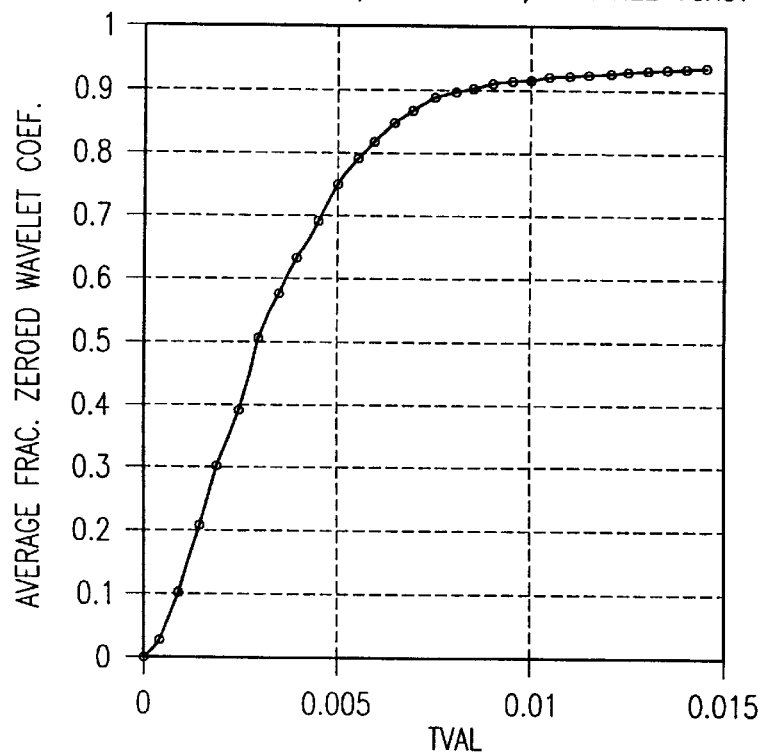
FIGS. 12a and 12b depict SNR vs. sparsening using a coefficient template.
Figure 12B:
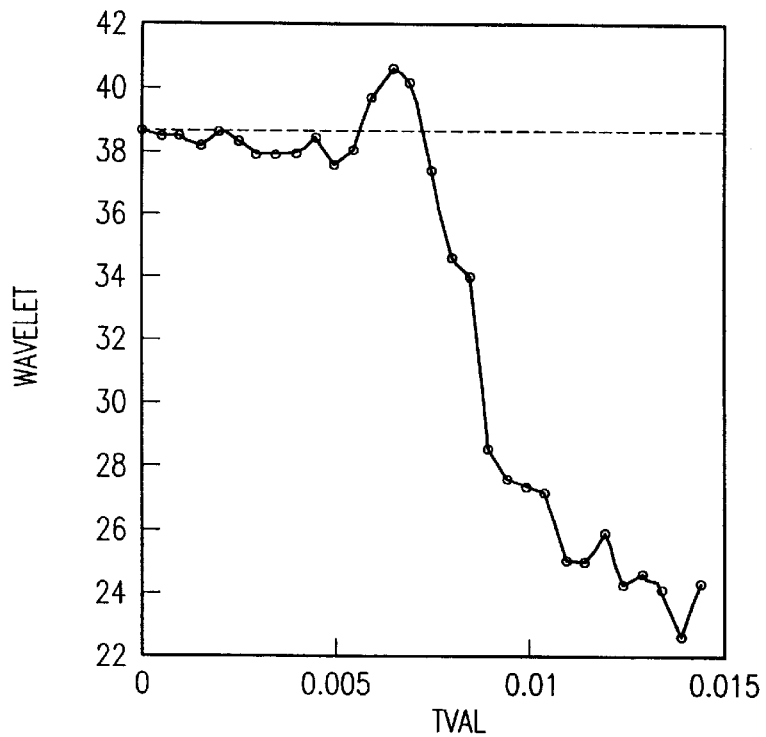

FIGS. 12a and 12b depict SNR vs. sparsening using a coefficient template.

Data Domain Processing

In practice, STAP calculations may be performed in the data (voltage) domain using the M×M sample covariance matrix, $\Lambda$, computed as $$\Lambda = \frac{1}{N} A^* A \quad [2]$$

where A is an N×M data matrix.
Using QR-decomposition:

$$A=QR \Rightarrow A^*A=R^*Q^*QR=R^*R \quad [3]$$

where R is an M×M upper triangular matrix.

Similarly, one can factor the covariance matrix using Cholesky decomposition; to within a scale factor:

$$\Lambda=LL^* \quad [4]$$

Eq. [1] can now be written as:

$$\Lambda w_n = LL^* w_n = s_n = L(p_n) : p_n = L^* w_n \quad [5]$$

Since L is lower triangular, the solution is found by two back-substitutions. The wavelet transform can be applied to the data matrix A and coefficient thresholding applied. Using this approach, only the significant elements of $\Lambda$ need be computed. Similarly, we know from the previous section that only certain covariance matrix elements are significant in the wavelet domain. These can be related to the data domain through Eq.2:

$$\Lambda_{ij} = \frac{1}{N} \sum_{k=1}^{N} A_{ik}^* A_{kj} \quad [6]$$

DWT and Block Toeplitz Symmetry

In this section, the inventive method by which the wavelet transformation can be constructed to preserve a block Toeplitz structure is disclosed. Consider the example of $\Lambda$ being a 32×32 matrix of 8×8 Toeplitz subblocks. We first define an orthogonal 8×8 wavelet transform, $Q_0$ and then form the tensor product Q:

$$Q \equiv \begin{bmatrix} Q_0 & 0 & 0 & 0 \\ 0 & Q_0 & 0 & 0 \\ 0 & 0 & Q_0 & 0 \\ 0 & 0 & 0 & Q_0 \end{bmatrix}; \quad \Lambda \equiv \begin{bmatrix} T_0 & T_{-1} & T_{-2} & T_{-3} \\ T_1 & T_0 & T_{-1} & T_{-2} \\ T_2 & T_1 & T_0 & T_{-1} \\ T_3 & T_2 & T_1 & T_0 \end{bmatrix} \quad [7]$$

It is easily shown that Q is orthogonal and preserves the block Toeplitz structure of $\Lambda$:

$$Q^* = \begin{bmatrix} Q_0^* & 0 & 0 & 0 \\ 0 & Q_0^* & 0 & 0 \\ 0 & 0 & Q_0^* & 0 \\ 0 & 0 & 0 & Q_0^* \end{bmatrix} = \begin{bmatrix} Q_0^{-1} & 0 & 0 & 0 \\ 0 & Q_0^{-1} & 0 & 0 \\ 0 & 0 & Q_0^{-1} & 0 \\ 0 & 0 & 0 & Q_0^{-1} \end{bmatrix} = Q^{-1} \quad [8]$$

$$Q^*\Lambda Q = \begin{bmatrix} Q_0^* & 0 & 0 & 0 \\ 0 & Q_0^* & 0 & 0 \\ 0 & 0 & Q_0^* & 0 \\ 0 & 0 & 0 & Q_0^* \end{bmatrix} \begin{bmatrix} \Lambda_0 & \Lambda_{-1} & \Lambda_{-2} & \Lambda_{-3} \\ \Lambda_1 & \Lambda_0 & \Lambda_{-1} & \Lambda_{-2} \\ \Lambda_2 & \Lambda_1 & \Lambda_0 & \Lambda_{-1} \\ \Lambda_3 & \Lambda_2 & \Lambda_1 & \Lambda_0 \end{bmatrix}$$

$$\begin{bmatrix} Q_0 & 0 & 0 & 0 \\ 0 & Q_0 & 0 & 0 \\ 0 & 0 & Q_0 & 0 \\ 0 & 0 & 0 & Q_0 \end{bmatrix} =$$

$$\begin{bmatrix} Q_0^*\Lambda_0 Q_0 & Q_0^*\Lambda_{-1} Q_0 & Q_0^*\Lambda_{-2} Q_0 & Q_0^*\Lambda_{-3} Q_0 \\ Q_0^*\Lambda_1 Q_0 & Q_0^*\Lambda_0 Q_0 & Q_0^*\Lambda_{-1} Q_0 & Q_0^*\Lambda_{-2} Q_0 \\ Q_0^*\Lambda_2 Q_0 & Q_0^*\Lambda_1 Q_0 & Q_0^*\Lambda_0 Q_0 & Q_0^*\Lambda_{-1} Q_0 \\ Q_0^*\Lambda_3 Q_0 & Q_0^*\Lambda_2 Q_0 & Q_0^*\Lambda_{-1} Q_0 & Q_0^*\Lambda_0 Q_0 \end{bmatrix} =$$

$$\begin{bmatrix} \tilde{\Lambda}_0 & \tilde{\Lambda}_{-1} & \tilde{\Lambda}_{-2} & \tilde{\Lambda}_{-3} \\ \tilde{\Lambda}_1 & \tilde{\Lambda}_0 & \tilde{\Lambda}_{-1} & \tilde{\Lambda}_{-2} \\ \tilde{\Lambda}_2 & \tilde{\Lambda}_1 & \tilde{\Lambda}_0 & \tilde{\Lambda}_{-1} \\ \tilde{\Lambda}_3 & \tilde{\Lambda}_2 & \tilde{\Lambda}_1 & \tilde{\Lambda}_0 \end{bmatrix} = \tilde{\Lambda}$$

[9]

Thus, a novel scheme for the efficient implementation of multiresolution STAP is disclosed. In addition to potential throughput reductions, the multiresolution formulation affords much broader and more flexible processing capabilities.

The present invention has been described herein with reference to a particular embodiment for a particular application. Those having ordinary skill in the art and access to the present teachings will recognize additional modifications applications and embodiments within the scope thereof.

It is therefore intended by the appended claims to cover any and all such applications, modifications and embodiments within the scope of the present invention.

Accordingly,

What is claimed is:

1. A system for processing a composite signal from a sensor and providing a plurality of tap weights in response thereto, said system including:

means for providing a matrix of data values;

means for performing a wavelet transformation of said matrix and providing a set of coefficients in response thereto, wherein the wavelet transformation is constructed to preserve a block Toeplitz structure;

means for sparsing said coefficients to provide a sparsed matrix; and means for performing an inverse wavelet transformation of said sparsed matrix to provide said tap weights.

2. An image processing system comprising:

sensing means for providing a plurality of data values corresponding to a scene including a target and clutter and providing a first composite input signal in response thereto;

estimation means for processing said composite signal and providing a plurality of tap weights in response thereto, said estimation means including:

means for providing a matrix of said data values, means for performing a wavelet transformation of said matrix and providing a set of coefficients in response thereto, means for sparsing said coefficients to provide a sparsed matrix, and means for performing an inverse wavelet transformation of said sparsed matrix to provide said tap weights; and means for applying said tap weights to said composite signal to provide a clutter reduced output signal.

3. The invention of claim 2 wherein said sensor means includes an array of sensor elements.

4. The invention of claim 2 wherein said sensor means includes a radar sensor.

5. The invention of claim 2 wherein said sensor means includes an electro-optic sensor.

6. The invention of claim 2 wherein said matrix is a covariance matrix.

7. The invention of claim 2 wherein said matrix is a data matrix.

8. The invention of claim 2 further including means for applying a set of steering vectors to said estimation means.

9. The invention of claim 2 further including the step of inverting said sparsed matrix.

10. The invention of claim 2 wherein the wavelet transformation is constructed to preserve a block Toeplitz structure.

11. A method for processing a composite signal from a sensor and providing a plurality of tap weights in response thereto, said method including the steps of:

providing a matrix of data values;

performing a wavelet transformation of said matrix and providing a set of coefficients in response thereto, wherein the wavelet transformation is constructed to preserve a block Toeplitz structure;

sparsing said coefficients to provide a sparsed matrix, and performing an inverse wavelet transformation of said sparsed matrix to provide said tap weights.

12. An image processing method including the steps of:

providing a plurality of data values corresponding to a scene including a target and clutter and providing a first composite input signal in response thereto;

processing said composite signal and providing a plurality of tap weights in response thereto, said processing step further includes the steps of:

providing a matrix of said data values, performing a wavelet transformation of said matrix and providing a set of coefficients in response thereto, sparsing said coefficients to provide a sparsed matrix, and performing an inverse wavelet transformation of said sparsed matrix to provide said tap weights; and applying said tap weights to said composite signal to provide a clutter reduced output signal.

* * * * *